April 30, 1940.   H. A. SWEM   2,199,212
METHOD OF BRAZING OR SOLDERING A WIRE SCREEN TO A METAL FRAME
Filed July 11, 1939   2 Sheets-Sheet 2
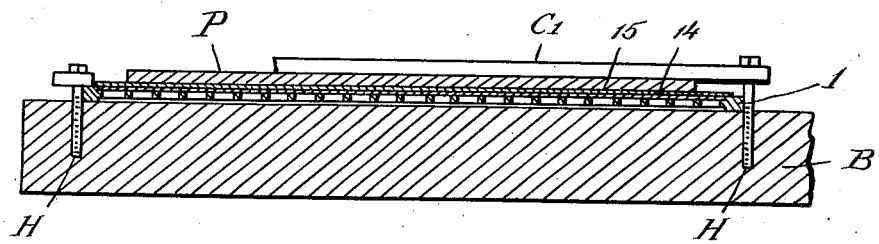
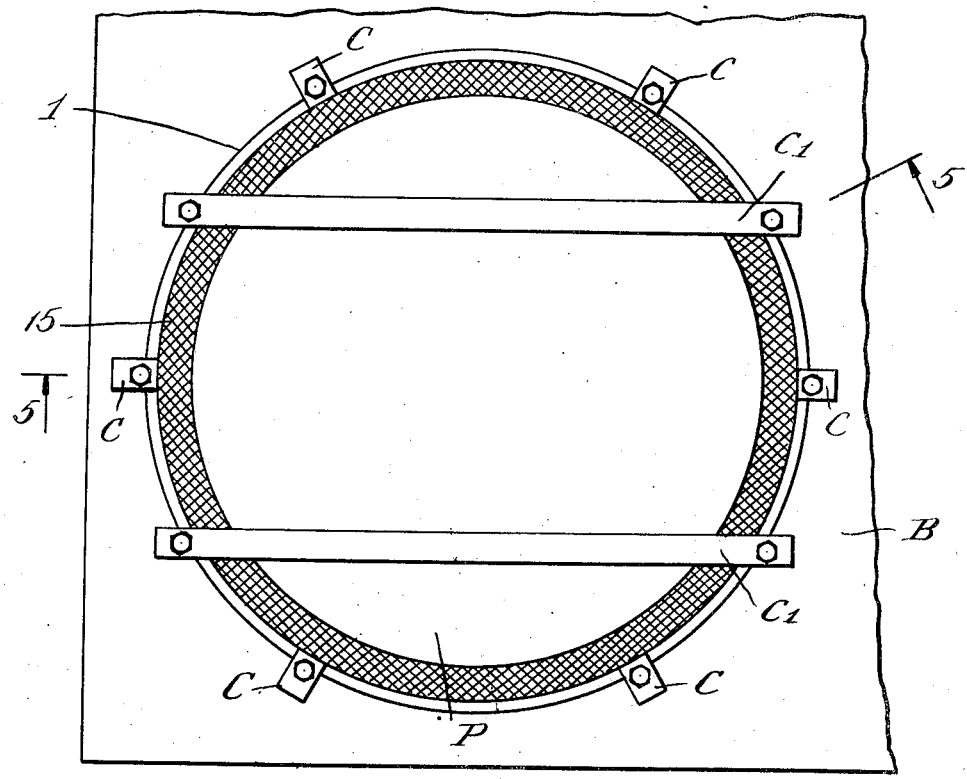
INVENTOR
Harry A. Swem
BY
Pennie, Davis, Marvin & Edmonds
ATTORNEYS Patented Apr. 30, 1940

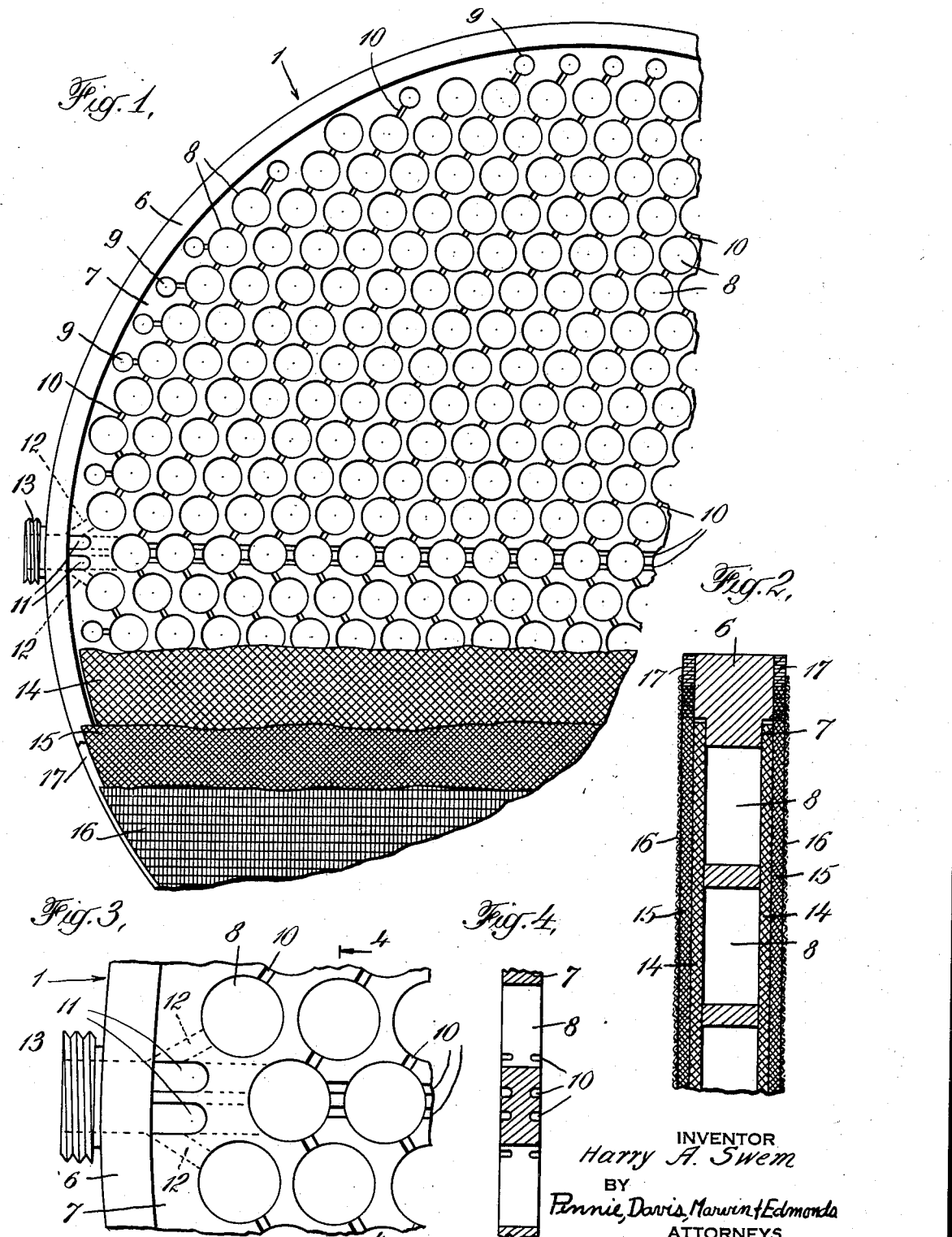

2,199,212

UNITED STATES PATENT OFFICE 2,199,212

METHOD OF BRAZING OR SOLDERING A WIRE SCREEN TO A METAL FRAME

Harry A. Swem, New Gulf, Tex., assignor to Texas Gulf Sulphur Company, a corporation of Texas Application July 11, 1939, Serial No. 283,833

10 Claims. (Cl. 140—3)

This invention relates to a method of brazing and soldering metal screens to metal frames and has for its object the provision of an improved method of this character. More particularly, the invention comprises the brazing of an edge portion of a wire screen to a metal frame and includes a sequence of operations for securing the screen to the frame and for removing any irregularities or bulges which may arise, making the screen flat and drum-tight.

The invention may advantageously be applied in forming a filter leaf; for example, a filter leaf such as is described and claimed in my copending application Serial No. 207,450, filed May 12, 1938, of which this application is a continuation-in-part. The invention in its more complete aspects, and as applied to the production of a filter leaf, involves a method of soldering a fine mesh screen to the frame and to the preparation of the frame for the soldering treatment of the invention.

The foregoing and other novel features of the invention will be better understood from the following description taken in conjunction with the accompanying drawings, in which:

Fig. 1 is a fragmentary plan view, partly in section, of a filter leaf embodying the novel features of the invention;

Fig. 2 is a sectional detail of the filter leaf of Fig. 1;

Fig. 3 is a detail plan view of the filtrate outlet, with the screens removed;

Fig. 4 is a sectional detail on the section line 4—4 of Fig. 3;

Fig. 5 is a sectional view taken along the line 5—5 of Fig. 6, and

Fig. 6 is a fragmentary plan view illustrating an arrangement of apparatus used in carrying out a method according to the invention.

The method of the invention will be described in connection with the manufacture of a filter leaf, it being understood, of course, that the invention may be applied in brazing or soldering screens to any metal frames. In describing the filter leaf illustrated in the accompanying drawings, I shall give certain details of configuration, dimensions, screen-meshes, materials and structural features of an actual filter leaf that has given excellent results in filtering molten sulphur, but it will, of course, be understood that these details are given merely by way of example and are not to be taken as restrictions or limitations of the invention.

The frame or chassis 1 of the filter leaf is a solid disc of sheet steel 27 inches in diameter, ¾ inch thick for ⅝ inch in from the periphery, then recessed on both sides to a depth of 0.111 inch for the remaining surface of the disc. This provides on each side of the disc a narrow peripheral rim 6 and a recessed surface 7. The recessed surface of the disc has numerous small holes or apertures 8 drilled through it, 1 inch in diameter, following a regular pattern, and smaller holes 9 filling in (where necessary) the space between the periphery of the recessed surface and the outside of the regular pattern of 1 inch holes. No holes are drilled within ¼ inch of the recess line. Grooves or channels 10 are cut in the surface between the holes 8 and 9, following a regular pattern, to permit the flow of filtrate to a common discharge outlet 11 in the rim of the disc. The three holes 8 adjacent the outlet 11 are connected thereto by ports 12. A threaded outlet connection 13, registering with the outlet 11, is brazed to the rim of the disc.

A relatively coarse-mesh double crimped and rolled wire screen 14 of a thickness equal to the depth of the recess is positioned in the recess on each side of the disc. The screen 14 is about 25½ inches in diameter (slightly less than the diameter of the recess), and may advantageously be 8 mesh of 16 gauge steel wire, flat-rolled to 0.111 inch. A somewhat finer mesh (about 9½ mesh) screen 15 covers the inner screen 14, overlapping the latter about one-half inch and secured by brazing to the peripheral rim 6. The screen 15 is 26½ inches in diameter and is also a double crimped and rolled wire screen made of 16 gauge steel wire, flat rolled to a thickness of 0.111 inch.

The two screens 14 and 15 constitute inner and outer back-up screens for a filter screen or cloth 16. The filter screen 16 is 26¾ inches in diameter and may advantageously be a 200 mesh stainless metal woven wire screen or cloth, the wires being of a diameter less than 0.008 inch. The filter screen 16 is sweat soldered to the brazed peripheral rim of the outer back-up screen 15 and to the annular rim of brazed metal 17, as will be more particularly described hereinafter.

In brazing the screen 15 to the disc, care must be taken to minimize warping of both the screen and the disc due to the heat of the brazing operation, and corrective measures should be taken to correct such warping as almost inevitably occurs. These ends are attained, in accordance with the improved brazing method of the invention, by firmly clamping the filter discs (three discs preferably being prepared at one time), singly and in a horizontal position to a massive cast steel block B, say approximately 6 feet square and 6 inches thick, provided with appropriately positioned clamp holes H in which the clamps C are secured (Figs. 5 and 6). The screen 14 is then placed in the top recessed portion of the disc, and the screen 15 is laid on top, centered, and held in place by means of a circular steel plate P, 23 inches in diameter and 1 inch thick; the steel plate being firmly secured to the steel block by clamps $C_1$.

The welder first tacks each screen 15 in place by brazing spots at 90° intervals along the periphery of the screen. Brazing then proceeds on the three filter discs in rotation, about 5 minutes brazing time being allowed on any one screen. The welder's schedule per filter disc, as he moves to it in turn, is as follows: place of beginning, thence 180°, thence a quarter point, thence 180°, and so on. To hasten cooling, compressed air is blown on the freshly brazed portion, when the welder moves to the next filter disc. When the brazing on a filter disc is completed, the disc is allowed to cool in the clamped position, and the clamps are removed when the disc is cold. With this method the disc itself warps but slightly, and can be brought back to shape cold by a few light hammer blows.

Two warping effects tend to develop in the screen 15, due to the heat of the brazing operation. The most frequent is that the screen surface becomes bulged and convex, in some cases rising as much as 3/8 inch at the center. The second effect are wave-like irregularities in the surface, not concentric, but more nearly parallel to a diameter of the disc. Both effects are corrected, in accordance with the method of the invention, as follows: The disc is again clamped to the steel block, the same as when the original brazing was being done. Two welder's torches, spaced 180° apart, are used to bring the exposed portion of the screen 15, between the steel plate P and the inner edge of the brazing, to a dull red heat. While maintaining this exposed portion of the screen at a dull red heat, two men, positioned 180° apart, strike the plate with light blows near its periphery. The men slowly rotate their blows around. After circling the plate two or three times with these light hammer blows, the filter-disc is allowed to cool, unclamped and examined. It generally takes from 3 to 6 heats to work the screen 15 down to a drum-tight plane surface.

The principle involved in the foregoing procedure for correcting warping of the screen 15 is a gradual upsetting of the individual wires of the screen. This is materially promoted by the steady pressure applied through the plate, and by the light hammer blows on its periphery. Care should be taken that upsetting of the wires of the screen 15 does not all take place in any one short segment, since otherwise short pressure ridges will develop, and these will materially shorten the useful life of the screen.

The screen 15 is brazed to the rim 6 of the filter disc from about 1/4 inch in from its periphery and thence to the outer edge of the rim, thus giving an annular brazed surface 1/2 inch wide. The surface of the rim 6 is built up with the brazed metal (bronze) to a slightly greater thickness than the thickness (0.111 inch) of the screen 15. Brazing in this manner serves three functions, viz: (1) to secure or fasten the screen to the disc, (2) to provide a surface easily tinned for soldering of the filter screen, (3) to provide, with minimum amount of machining, a practically true plane surface from edge to edge of the filter leaf.

The filter leaf is next placed in a lathe and all excess brazing is removed by machining, so that both sides of the leaf are as near true planes as possible. The brazed portion of each screen 15 (1/4 inch in from its periphery) now has no bronze on the surface, but the mesh openings are filled with bronze. The remainder of the rim 6 to its outer edge is a solid bronze surface (17 of Figs. 1 and 2).

The filter screen 16 is sweat-soldered to the brazed peripheral surface of the disc (and screen 15) by an antimonial-tin solder. Preferably, the solder is made up of 5½% antimony and 94½% tin, and an acidless flux in liquid form is used. The brazed surface (including the small squares of bronze left in the meshes of the screen 15) is thoroughly cleaned and tinned with the antimonial-tin solder. All excess solder is scraped and sanded off, so that the tinned coat is about 0.01 inch in thickness. The leaf is then washed in water and then in alcohol. The filter screen 16 (26¾ inches in diameter) is washed in alcohol to remove the oils used while weaving, and is then tinned, using as thin a coat as possible, on one side only for a distance of 3/8 inch in from the periphery. This fine-mesh screen is not scraped or sanded, for fear of displacing the "shoot" wires.

The filter screen 16 is placed, tinned side down, upon the screen 15, and centered. A moist asbestos pad, 24 inches in diameter and 1/4 inch thick, is placed on top of the filter screen. One of the aforementioned plates is placed on top of the asbestos pad, but not clamped down. Warping of the filter screen during the sweat-soldering operation is thus prevented.

The filter screen is first sweated in position, using ten pound soldering irons, at four points 90° apart. Soldering by the sweating method then proceeds, 2 inches at a time being soldered along the circumference, moving from the place of beginning to a point 180°, then a quarter point, then 180°, and so on. Soldered places are promptly cooled by small amounts of clean water. Once started, the soldering is carried on to completion. When the filter screen has been thus soldered to the rim 6, the leaf is immediately washed in water, given an alcohol bath and air dried. Another filter screen 16 is then similarly soldered to the opposite side of the leaf. In this manner the filter screens are secured to the opposite faces of the leaf without warping.

The recessed portion of the filter disc provides a support for the screens 14 and 15 when they are attached to the steel block B and supports the plate P. It is understood that wire screens may be attached to metal frames which do not have such recessed portion offering support. Where the frame is completely open in the center, a metal blank may be placed inside the frame to support the screen and the plate, and the operation carried on as described.

I claim:

1. The method of brazing a wire screen to a metal frame which comprises clamping the frame with the screen properly positioned thereon and a superposed metal plate of smaller size than the screen to a metal block, conducting the brazing operation for short intervals of time at substantially symmetrically different places around the periphery of the screen with an interval of cooling following each interval of brazing until the screen is fastened along its entire periphery to the frame, and permitting the frame, screen and superposed plate to cool in the clamped position.

2. The method of brazing a wire screen to a metal frame which comprises clamping the frame with the screen properly positioned thereon and a superposed metal plate of smaller size than the screen to a metal block, conducting the brazing operation for short intervals of time at different places around the periphery of the screen with an interval of cooling following each interval of brazing until the screen is fastened along its entire periphery to the frame, building-up during the brazing operation the peripheral portion of the frame beyond the screen with the brazing metal to approximately the thickness of the screen, and permitting the frame, screen and superposed plate to cool in the clamped position.

3. The method of brazing a wire screen to a metal frame which comprises clamping the frame with the screen properly positioned thereon and a superposed metal plate of smaller size than the screen to a metal block, conducting the brazing operation for short intervals of time at different places around the periphery of the screen with an interval of cooling following each interval of brazing until the screen is fastened along its entire periphery to the frame, subsequently heating the portion of the screen extending beyond the metal plate and clamped as before to a dull red heat and simultaneously imparting light hammer blows near the periphery of the metal plate and thereby upsetting the individual wires of the screen to an extent to impart to the screen a drum-tight plane surface.

4. The method of brazing a wire screen to a metal frame which comprises clamping the frame with the screen properly positioned thereon and a superposed metal plate of smaller size than the screen to a metal block, conducting the brazing operation for short intervals of time at different places around the periphery of the screen with an interval of cooling following each interval of brazing until the screen is fastened along its entire periphery to the frame, building-up during the brazing operation the peripheral portion of the frame beyond the screen with the brazing metal to approximately the thickness of the screen, permitting the frame, screen and superposed plate to cool in the clamped position, and subsequently removing excess of the brazing metal by machining to give the screen and adjacent built-up peripheral portion of the frame a practically true plane surface.

5. The method of brazing a wire screen to a metal frame which comprises clamping the frame with the screen properly positioned thereon and a superposed metal plate of smaller size than the screen to a metal block, conducting the brazing operation for short intervals of time at different places around the periphery of the screen with intervals of cooling between the intervals of brazing until the screen is fastened along its entire periphery to the frame, building-up during the brazing operation the peripheral portion of the frame beyond the screen with the brazing metal to approximately the thickness of the screen, permitting the frame, screen and superposed plate to cool in the clamped position, subsequently heating the portion of the screen extending beyond the metal plate and clamped as before to a dull red heat and simultaneously imparting light hammer blows near the periphery of the metal plate and thereby upsetting the individual wires of the screen to an extent to impart to the screen a drum-tight plane surface, and removing excess of the brazing metal by machining to give the screen and adjacent built-up peripheral portion of the frame a practically true plane surface.

6. The method of soldering a fine-mesh wire screen to a metal frame which comprises superposing on the screen properly positioned on the frame a moistened pad of absorbent material of smaller size than the screen and held in contact therewith by a metal plate approximating the size of the pad, and conducting the soldering operation for short intervals of time at different places around the periphery of the screen with an interval of cooling following each interval of soldering until the screen is fastened along its entire periphery to the frame.

7. The method of soldering a fine-mesh wire screen to a metal frame which comprises superposing on the screen properly positioned on the frame a moistened pad of absorbent material of smaller size than the screen and held in contact therewith by a metal plate approximating the size of $_2$the pad, preliminarily tinning the peripheral contacting surfaces of the frame and screen with an antimonial-tin solder composed for the most part of tin and containing about 5-6% of antimony, and sweat-soldering said contacting and tinned surfaces for short intervals of time at different and substantially symmetrical places around the periphery of the screen with an interval of cooling following each interval of soldering until the screen is fastened along its entire periphery to the frame.

8. The method of removing bulges or irregularities from a wire screen brazed at its edge portion to a metal frame which comprises placing the frame and screen over a block, the screen being supported on the block between its edges, placing a metal plate over the screen, said plate being smaller than the screen leaving a part of the screen between the brazed portion and the plate uncovered, heating the said uncovered portion of the screen, and tapping the plate with a hammer around its edge to upset the wire and give to the screen a flat drum-tight form.

9. The method of brazing the entire edge portion of a wire screen to a metal frame which comprises placing the screen over the frame, supporting the screen between its edge portions, clamping the screen to the frame, brazing the edge portion of the screen to the frame at spaced intervals and then brazing the intervening spaces, and then heating the screen near the edge portion to at least a dull red and mechanically upsetting the wires to give to the screen a drum-tight form.

10. The method of brazing the entire edge portion of a wire screen to a metal frame which comprises placing the screen over the frame, securing the screen to the frame, brazing the edge portion of the screen to the frame at spaced intervals and then brazing the intervening spaces, and then heating the screen near the edge portion to at least a dull red and mechanically upsetting the wires to give to the screen a drum-tight form.

HARRY A. SWEM.